United States Patent

Mimoto et al.

[11] Patent Number: 5,448,298
[45] Date of Patent: Sep. 5, 1995

[54] IMAGE INFORMATION TRANSMITTING SYSTEM

[75] Inventors: Akihiro Mimoto; Akio Aoki, both of Tokyo; Yoshiki Ishii, Hadano, all of Japan

[73] Assignee: Canon Kabushiki Kaisha, Tokyo, Japan

[21] Appl. No.: 338,815

[22] Filed: Nov. 10, 1994

Related U.S. Application Data

[63] Continuation of Ser. No. 196,799, Feb. 15, 1994, abandoned, which is a continuation of Ser. No. 914,028, Jul. 15, 1992, abandoned, which is a continuation of Ser. No. 524,450, May 17, 1990, abandoned.

[30] Foreign Application Priority Data

| May 19, 1989 | [JP] | Japan | 1-126379 |
| May 19, 1989 | [JP] | Japan | 1-126380 |
| May 19, 1989 | [JP] | Japan | 1-126381 |

[51] Int. Cl.6 .................................................. H04N 7/12
[52] U.S. Cl. .................................... 348/420; 348/421
[58] Field of Search ............... 348/420, 421, 409, 410, 348/588, 469, 470, 471, 472, 473; 371/38.1, 39.1, 8.2, 11.2, 37.1, 37.7; H04N 7/12

[56] References Cited

U.S. PATENT DOCUMENTS

| 3,979,721 | 9/1976 | Umemoto et al. | 340/146.1 F |
| 4,376,290 | 3/1983 | Shirota | 358/314 |
| 4,703,352 | 10/1987 | Kondo | 358/135 |
| 4,722,003 | 1/1988 | Kondo | 358/135 |
| 4,792,953 | 12/1988 | Pasdera et al. | 371/31 |
| 4,802,005 | 1/1989 | Kondo | 358/136 |
| 4,845,560 | 7/1989 | Kondo et al. | 358/136 |
| 4,890,161 | 12/1989 | Kondo | 358/133 |
| 4,903,124 | 2/1990 | Hoshi et al. | |
| 4,947,249 | 8/1990 | Kondo | 358/135 |
| 4,953,019 | 8/1990 | Skikakura et al. | |
| 4,953,023 | 8/1990 | Kondo | 358/136 |
| 5,122,876 | 6/1992 | Hoki | 358/133 |
| 5,150,210 | 9/1992 | Hoshi et al. | 358/135 |

FOREIGN PATENT DOCUMENTS

0225181 6/1987 European Pat. Off.

*Primary Examiner*—James J. Groody
*Assistant Examiner*—Michael H. Lee
*Attorney, Agent, or Firm*—Fitzpatrick, Cella, Harper & Scinto

[57] ABSTRACT

In an image information transmitting system of this invention, an image information signal constituted by a plurality of data constituting one frame is input. A plurality of pixel data blocks each consisting of a predetermined number of pixel data are formed from the input image information signal. Dynamic range information data associated with dynamic ranges of values of the pixel data constituting each pixel data block are formed in units of the plurality of pixel blocks. The pixel data constituting the pixel data block is coded using the dynamic range information data to form a plurality of coded data in units of pixel data blocks. The dynamic range information data and the coded data are sent onto a transmission line. These transmitted data are received, and a data portion of the dynamic range information data and the coded data which has an error is interpolated. High-quality image information can be efficiently transmitted.

21 Claims, 9 Drawing Sheets

IMAGE INFORMATION TRANSMITTING SYSTEM

This application is a continuation of application Ser. No. 08/196,799 filed Feb. 15, 1994, which is a continuation of Ser. No. 07/914,028 filed Jul. 15, 1992, which is a continuation of Ser. No. 07/524,450, filed May 17, 1990, all now abandoned.

BACKGROUND OF THE INVENTION

1. Field of the Invention

The present invention relates to an image information transmitting system and, more particularly, to an image information transmitting system capable of performing high-efficiency coding.

2. Related Background Art

For example, a high-efficiency coding scheme for a television signal is known as an image information transmitting scheme of this type. In this high-efficiency coding scheme for the television signal, since a transmission band must be narrowed, a so-called MIN-MAX method for reducing the average number of bits per pixel is employed. The MIN-MAX method will be described below.

A television signal has strong correlation with time in a space. When an image is divided into small blocks, the blocks often have only a small dynamic range due to local correlation. A local dynamic range is obtained in each block, and adaptive coding is performed to perform highly efficient data compression.

This coding scheme will be described in detail with reference to the accompanying drawings.

Figure 1:
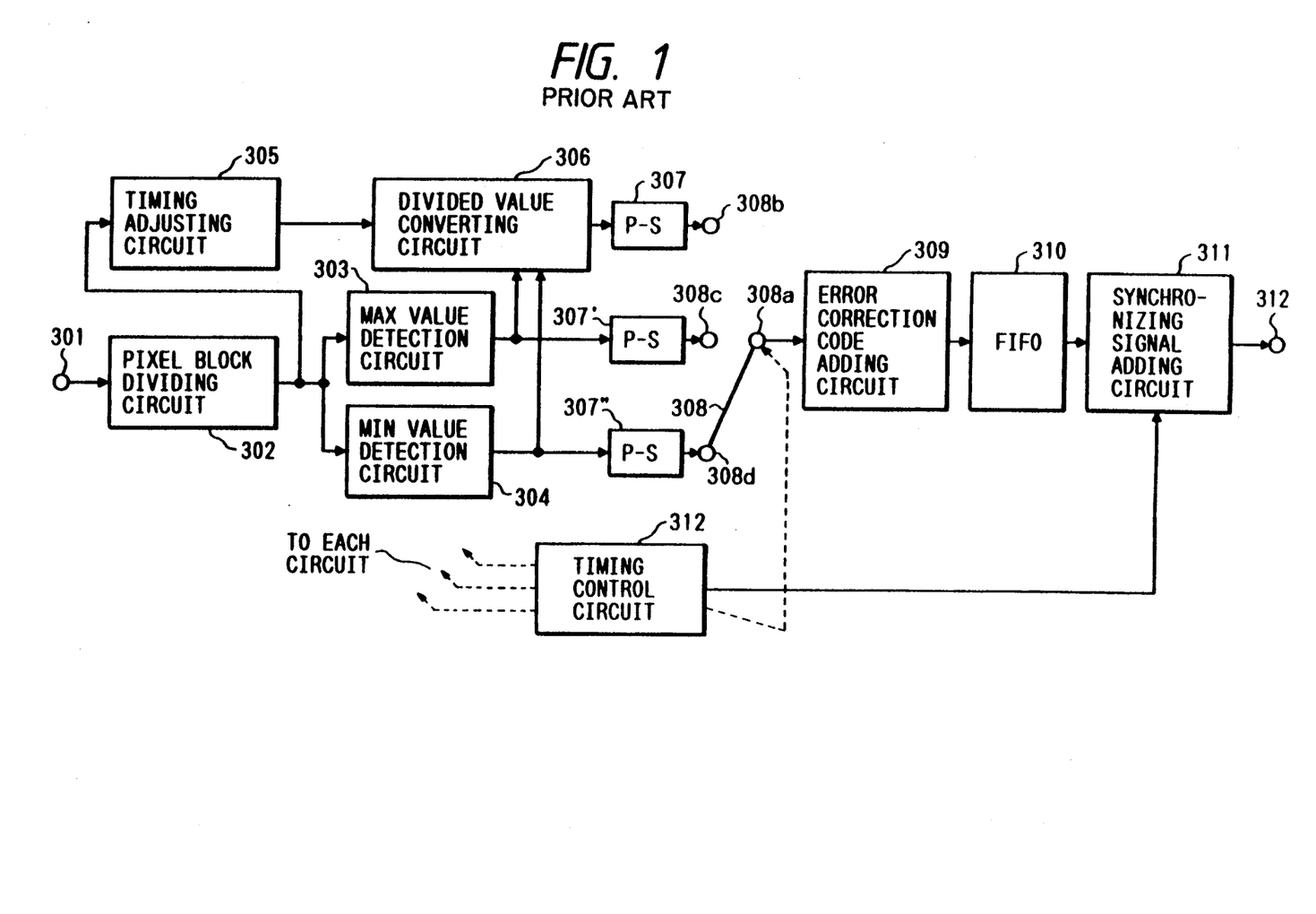
FIG. 1 is a schematic block diagram of a transmitting side in a conventional image information transmitting system.

FIG. 1 is a schematic block diagram of an image information transmitting system as a prior art. The image information transmitting system includes an input terminal 301. An analog signal obtained by raster-scanning, e.g., a television signal is sampled at a predetermined frequency, and data (n bits/sample) is input to the input terminal 301. The digital image data having $2^n$ gradation levels are supplied to a pixel block dividing circuit 302.

Figure 2:
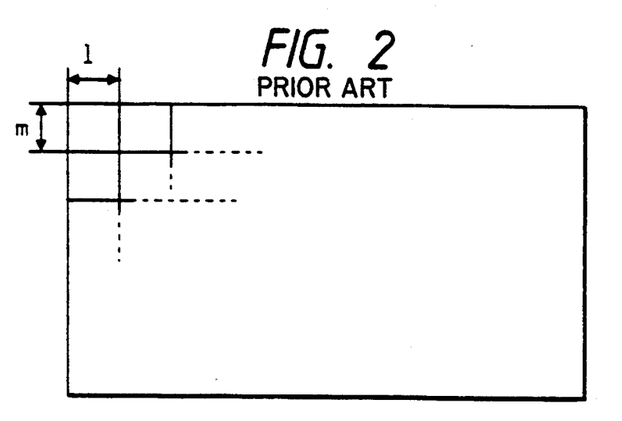
FIG. 2 is a view showing a state wherein all pixel data are divided into pixel blocks.

FIG. 2 is a view showing a state wherein one-frame pixel data are divided into pixel blocks. In the pixel block dividing circuit 302, the one-frame pixel data are temporarily stored in a memory or the like. As shown in FIG. 2, the pixel data are read out in units of blocks each having (l×m) pixels, i.e., l pixels in the horizontal direction (to be referred to as an H direction hereinafter) and m pixels in the vertical direction (to be referred to as a V direction thereinafter). That is, the data are output in units of pixel blocks.

Figure 3:
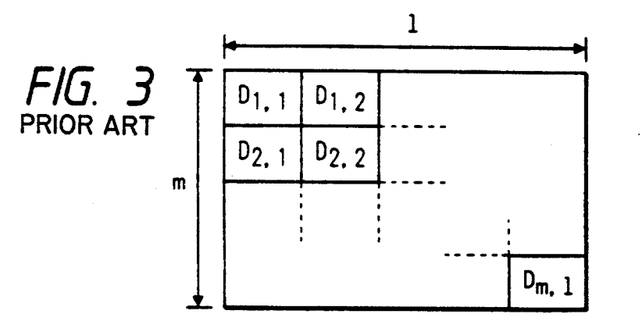
FIG. 3 is a view showing data layout of each pixel block.

FIG. 3 shows a format of each pixel block. This pixel block contains pixel data $D_{1,1}$ to $D_{m,l}$. Image data output from the pixel block dividing circuit 302 are input to a MAX value detection circuit 303, a MIN value detection circuit 304, and a timing adjusting circuit 305. Of all the pixel data ($D_{1,1}$ to $D_{m,l}$) in each pixel block, a pixel ($D_{max}$) having a MAX value and a pixel ($D_{min}$) having a MIN value are detected by and output from the detection circuits 303 and 304, respectively.

The timing adjusting circuit 305 delays all the pixel data by a period required to cause the MAX and MIN value detection circuits 303 and 304 to detect the pixels $D_{max}$ and $D_{min}$. The pixel data are sent to a divided value converting circuit 306 in units of pixel blocks in a predetermined order. For example, data are sent in an order of $D_{1,1}, D_{2,1}, D_{3,1}, \ldots, D_{m,1}, D_{1,2}, \ldots D_{m,2}, \ldots, D_{1,(l-1)}, \ldots D_{m,(l-1)}, D_{1,l}, \ldots,$ and $D_{m,l}$ in units of pixel blocks All the pixel data ($D_{1,1}$ to $D_{m,l}$) and MAX and MIN values ($D_{max}$ and $D_{min}$) of each pixel block are input to the divided value converting circuit 306 and are compared with $2^k$ (where k is an integer smaller than n) quantization levels between the values $D_{max}$ and $D_{min}$, thereby obtaining k-bit division codes ($\Delta_{1,1}$ to $D_{m,l}$). The quantization state is shown in FIG. 4A.

Figure 4A:
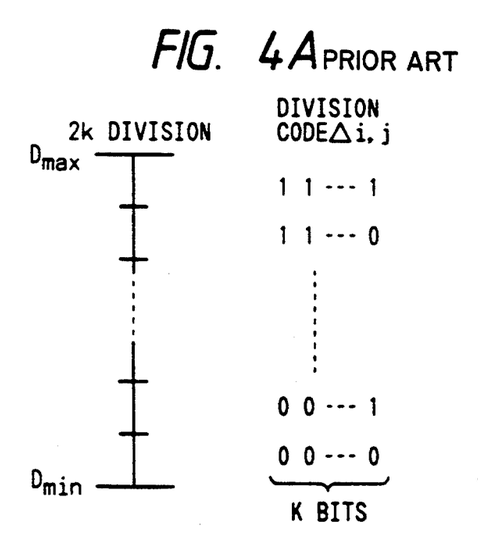
FIG. 4A is a view showing conversion characteristics of a divided value converting circuit shown in FIG. 1.
Figure 5A:
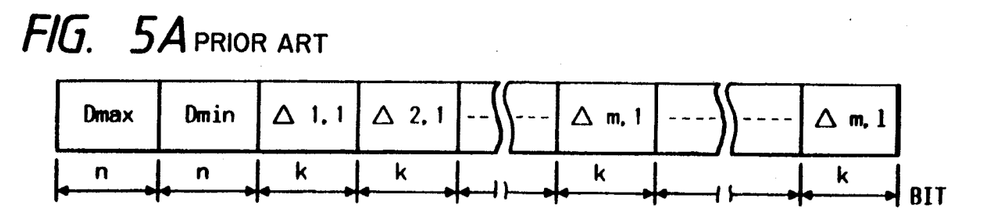
FIG. 5A is a view showing a data string output from a data selector 308 shown in FIG. 1.
Figure 5B:
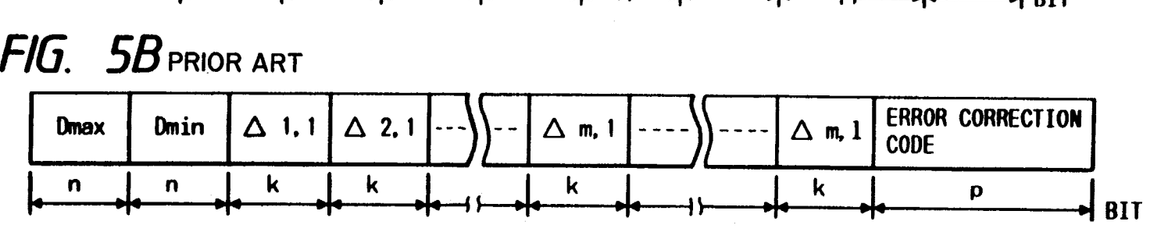
FIG. 5B is a view showing a transmission data string output from the transmitting system shown in FIG. 1.

As shown in FIG. 4A, the division code $\Delta_{i,j}$ is output as a k-bit binary code. The obtained k-bit division code $\Delta_{i,j}$ and the n-bit values $D_{max}$ and $D_{min}$ are converted into serial data by parallel-to-serial (P-S) converters 307, 307', and 307'', respectively. One of the outputs from the P-S converters is selected by a data selector 308, thus obtaining serial data shown in FIG. 5A. The data output from the data selector 308 is added with a p-bit error correction code (FIG. 5B) by an error correction code adding circuit 309. The output from the error correction code adding circuit 309 is processed by a first-in first-out (FIFO) memory 310 along the time axis so as to obtain a predetermined data transmission rate. In addition, an output from the FIFO memory 310 is added with a synchronizing signal by a synchronizing signal adding circuit 311. The obtained signal is sent out from an output terminal 312 onto a transmission line (a magnetic recording/reproducing system such as a VTR).

The synchronizing signal is added in units of pixel blocks or every plurality of pixel blocks. The operation timings of the above circuits are determined on the basis of timing signals output from a timing control circuit 313.

Figure 6:
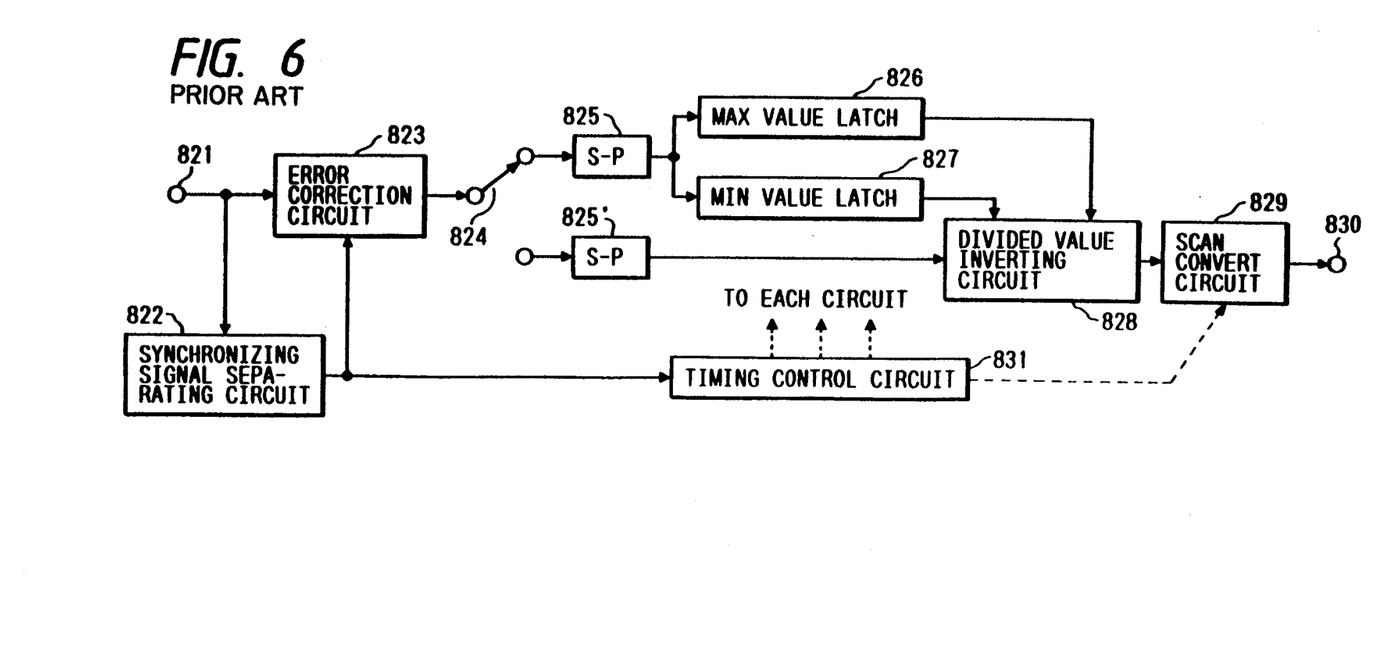
FIG. 6 is a schematic block diagram of a receiving side corresponding to the transmitting side of the image information transmitting system shown in FIG. 1.

FIG. 6 is a block diagram showing a schematic arrangement of a receiving side corresponding to a data transmitting side shown in FIG. 1. The receiving side in FIG. 6 includes an input terminal 821 for receiving transmission data highly efficiently coded at the transmitting side. The input transmission signal is supplied to a synchronizing signal separating circuit 822 and an error correction circuit 823.

The synchronizing signal separating circuit 822 separates a synchronizing signal from the input transmission data and sends the separated synchronizing signal to the error correction circuit 823 and a timing control circuit 831.

The error correction circuit 823 separates the error correction code from the transmission data in synchronism with the synchronizing signal supplied from the synchronizing signal separating circuit 822, detects a data error generated along the transmission line in accordance with the error correction code, corrects this error, and supplies the corrected data to a data selector 824.

The timing control circuit 831 controls operating timings of the respective circuits on the receiving side on the basis of the synchronizing signal supplied from the synchronizing signal separating circuit 822.

The data selector 824 separates the transmission data into the n-bit data $D_{max}$ and $D_{min}$ and the k-bit codes $\Delta_{i,j}$ quantized between the values $D_{max}$ and $D_{min}$. These separated data are supplied to serial-to-parallel (S-P) converters 825 and 825', respectively, and are converted into parallel data thereby. The MAX and MIN value data $D_{max}$ and $D_{min}$ converted into the parallel data by the S-P converter 825 are latched by latch circuits 826 and 827, respectively. The latched MAX and MIN value data $D_{max}$ and $D_{min}$ are supplied to a divided value inverting circuit 828. The division code $\Delta_{i,j}$ associated with all the pixel data in each pixel block are output from the S-P converter 825' in a predetermined order and are supplied to the divided value inverting converter 828.

Figure 4B:
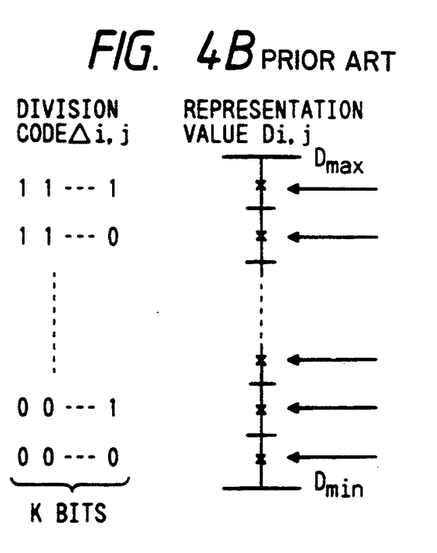
FIG. 4B is a view showing conversion characteristics of a divided value inverting circuit shown in FIG. 6 (to be described later)

FIG. 4B is a view showing a state wherein representation data $D_{i,j}'$ associated with the original pixel data are decoded from the division code $\Delta_{i,j}$ and the MAX and MIN value data $D_{max}$ and $D_{min}$. As shown in FIG. 4B, the representation value is set to be an intermediate value between the adjacent ones of $2^k$ quantization levels between the values $D_{max}$ and $D_{min}$. The resultant n-bit representation value data ($D_{1,1}'$ to $D_{m,l}'$) from the divided value inverting circuit 828 are output in units of pixel blocks in the predetermined order. In a scan convert circuit 829, output data from the divided value inverting circuit 828 is converted in an order corresponding to raster scan, and the obtained data appears as decoded image data at an output terminal 830.

In the conventional arrangement, however, in order to correct a data error occurring on the transmission line, the error correction code must be added to the transmission data at the transmitting side, and the obtained data is sent onto the transmission line. At the receiving side, the data error occurring on the transmission line is corrected by using the error correction code. Redundancy of the transmission data is increased by the error correction code, and transmission efficiency cannot be improved much.

SUMMARY OF THE INVENTION

It is an object of the present invention to provide an image information transmitting system which can solve the conventional problems described above.

It is another object of the present invention to provide an image information transmitting method which can effectively transmit high-quality image information.

In order to achieve this object according to an aspect of the present invention, there is provided a method of transmitting image information, comprising:

the first step of dividing a plurality of pixel data constituting one frame into a plurality of pixel data blocks for every predetermined number of pixel data;

the second step of forming distribution information data representing a distribution of values of the pixel data constituting each pixel data block in units of the plurality of pixel data blocks divided by the first step and position information data representing a correspondence between the pixel data constituting the pixel data blocks and positions in the distribution of the pixel data values represented by the distribution information data, and of transmitting the distribution information data and the position information data onto a transmission line; and the third step of receiving the distribution information data and the position information data sent onto the transmission line and interpolating data having an error in the transmitted data by interpolation data.

It is still another object of the present invention to provide an image information transmitting system which can efficiently transmit high-quality image information.

In order to achieve the above object according to another aspect of the present invention, there is provided an image information transmitting system comprising:

pixel data block forming means of inputting an image information signal constituted by a plurality of pixel data which forms one frame, and forming a plurality of pixel data blocks from the input image information signal, each of the plurality of pixel data blocks being formed by a predetermined number of pixel data;

transmitting means for forming dynamic range information data associated with a dynamic range of values of the pixel data constituting each pixel data block in units of the plurality of pixel data blocks formed by the pixel data block forming means, coding the pixel data constituting the pixel data block by using the dynamic range information data, forming a plurality of coded data in units of pixel data blocks, and transmitting the dynamic range information data and the coded data onto a transmission line; and interpolating means for receiving the dynamic information data and the coded data transmitted onto the transmission line by the transmitting means and interpolating data having an error in the dynamic range information data and the coded data by interpolation data.

The above and other objects, features, and advantages of the present invention will be apparent from the detailed description of the preferred embodiments in conjunction with the accompanying drawings.

DETAILED DESCRIPTION OF THE PREFERRED EMBODIMENTS

The present invention will be described in detail with reference to the preferred embodiments hereinafter.

Figure 7A:
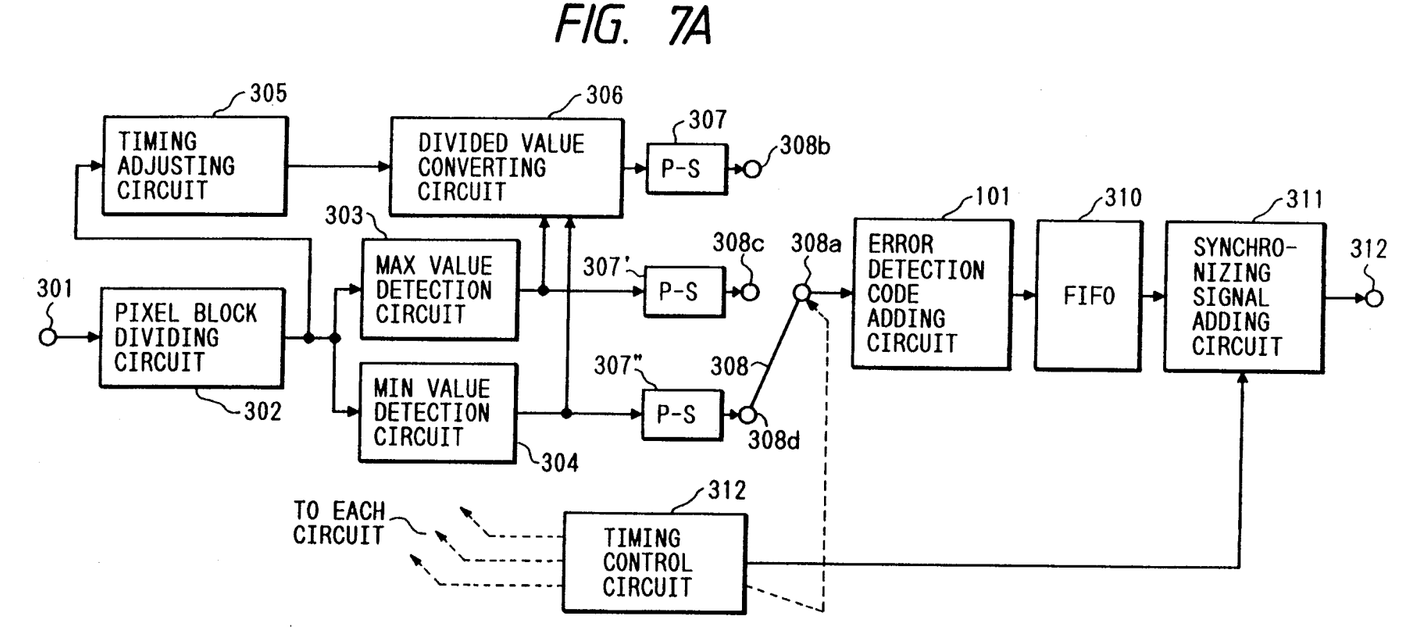
FIG. 7A is a schematic block diagram of a transmitting side of an image information transmitting system according to the first embodiment of the present invention.

FIG. 7A shows a schematic arrangement of a transmitting side of an image information transmitting system according to the first embodiment of the present invention. The same reference numerals as in FIG. 1 denote the same parts in FIG. 7A, and a detailed description thereof will be omitted.

Figure 7B:
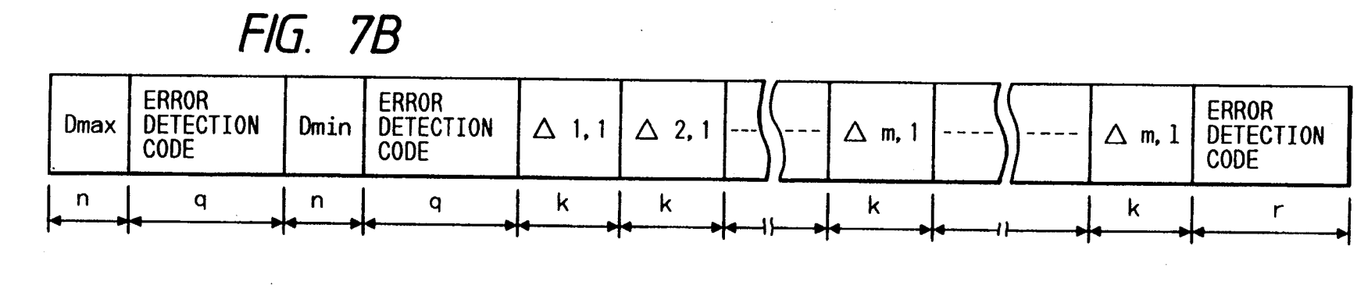
FIG. 7B is a view showing a transmission data string output from the transmitting side shown in FIG. 7A.

In this transmitting side shown in FIG. 7A, unlike the transmitting side shown in FIG. 1, an error detection code adding circuit 101 adds q- and r-bit error detection codes to serial data output from a data selector 308a, and the obtained data are supplied to a FIFO memory 310, as shown in FIG. 7B.

With the above arrangement, the error detection codes added by the error detection code adding circuit 101 are used to detect whether an error occurs in data. The number of bits of the error detection codes can be smaller than that of the error correction code, and redundancy of the transmission data can be reduced.

Figure 8:
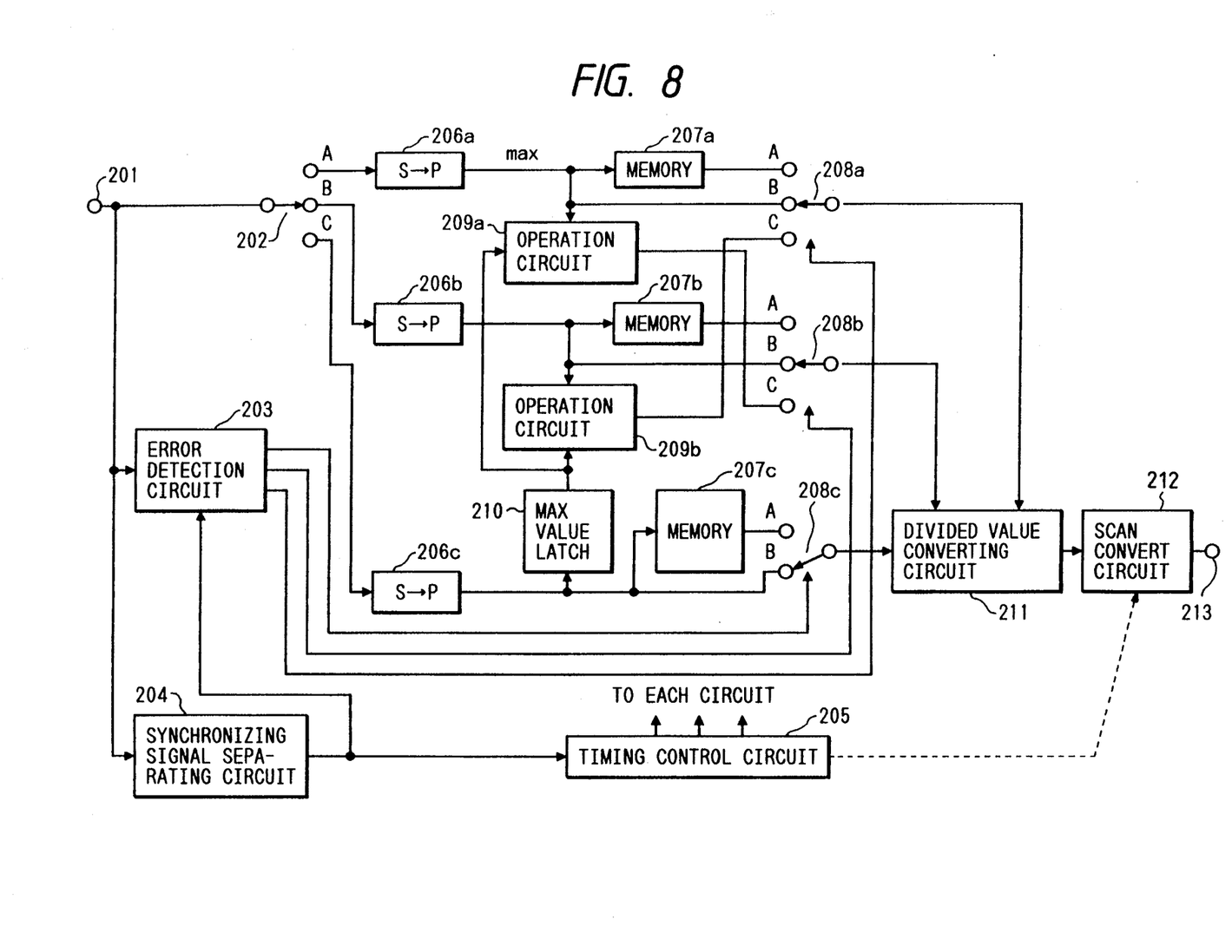
FIG. 8 is a schematic block diagram of a receiving side of the image information transmitting system according to the first embodiment of to the present invention.

FIG. 8 shows a schematic arrangement of a receiving side of the image information transmitting system according to the first embodiment of the present invention.

Referring to FIG. 8, the receiving side includes an input terminal 201 for receiving transmission data (FIG. 7B) coded with high efficiency by the transmitting side of FIG. 7A. The input transmission data is supplied to a data selector 202, an error detection circuit 203, and a synchronizing signal separating circuit 204.

In the synchronizing signal separating circuit 204, a synchronizing signal is separated from the input transmission data, and the separated synchronizing signal is supplied to the error detection circuit 203 and a timing control circuit 205.

The timing control circuit 205 controls operation timings of the respective circuits in the receiving side on the basis of the synchronizing signal supplied from the synchronizing signal separating circuit 204. The data selector 202 supplies the n-bit data $D_{max}$ to the A side, the n-bit data $D_{min}$ to the B side, and the k-bit code $\Delta_{i,j}$ obtained by quantizing the data between the data $D_{max}$ and $D_{min}$ to the C side. These data are converted by serial-to-parallel (S-P) converters 206a, 206b, and 206c into parallel data, respectively.

The MAX value data $D_{max}$ of each pixel block which is converted into the parallel data by the S-P converter 206a is supplied to a memory 207a, the B terminal of a data selector 208a, and an operation circuit 209a. The MIN value data $D_{min}$ of each pixel block which is converted into the parallel data by the S-P converter 206b is supplied to a memory 207b, the B terminal of a data selector 208b, and an operation circuit 209b. The division code $\Delta_{i,j}$ associated with each pixel data within each pixel block and converted into the parallel data by the S-P converter 206c is supplied to a memory 207c, the B terminal of a data selector 208c, and a MAX value latch 210.

The memories 207a, 207b, and 207c are used to delay the input data by a one-field period each. The A terminals of the data selectors 208a, 208b, and 208c receive the MAX value data $D_{max}$, the MIN value data $D_{min}$, and the division code $\Delta_{i,j}$, respectively, of the immediately preceding field period.

Of the division codes $\Delta_{i,j}$ associated with the pixel data within each pixel block output and output from the S-P converter 206c, division data representing a maximum value is latched by the latch 210. The division data latched by the MAX value latch 210 is supplied to the operation circuits 209a and 209b. The operation circuit 209a calculates interpolation MIN data $D_{min}'$ by using the MAX value data $D_{max}$ supplied from the S-P converter 206a and the division data supplied from the MAX value latch 210. The interpolation MIN value data $D_{min}'$ is supplied to the C terminal of the data selector 208b. The operation circuit 209b calculates interpolation MAX value data $D_{max}'$ by using the MIN value data $D_{min}$ supplied from the S-P converter 206b and the division data supplied from the MAX value latch 210. The interpolation MAX value data $D_{max}'$ is supplied to the C terminal of the data selector 208a.

Note that switching of the data selectors 208a, 208b, and 208c is controlled by an error detection result output from the error detection circuit 203. More specifically, when the error detection circuit 203 detects that no error occurs in the transmission data, the data selectors 208a to 208c are connected to the corresponding B terminals. When only the MAX value data $D_{max}$ has an error, the data selector 208a is connected to the C terminal, and the data selectors 208b and 208c are connected to the B terminals, respectively. When only the MIN value data $D_{min}$ has an error, the data selector 208b is connected to the C terminal, and the data selectors 208a and 208c are connected to the B terminals, respectively. When both the MAX and MIN value data $D_{max}$ and $D_{min}$ have errors, the data selectors 208a and 208b are connected to the A terminals, respectively, and the data selector 208c is connected to the B terminal. When the division code $\leftarrow_{i,j}$ has an error, all the data selectors 208a to 208c are connected to the A side.

In the above operation, when an error occurs in the transmission data, the interpolation data is output from the data selector 208a, the data selector 208b, and/or the data selector 208c. The MAX value data $D_{max}$, the MIN value data $D_{min}$, and the division code $\Delta_{i,j}$ respectively output from the data selectors 208a, 208b, and 208c are supplied to a divided value inverting circuit 211. The divided value inverting circuit 211 decodes the n-bit representation data $D_{i,j}$ associated with the original pixel data on the basis of the division code $\Delta_{i,j}$ and the data $D_{max}$ and $D_{min}$ as in the receiving side shown in FIG. 6. The decoded data is supplied to a scan convert circuit 212. The scan convert circuit 212 converts the output data from the divided value inverting circuit 211 in an order corresponding to raster scan, and the converted data is output as decoded image data from an output terminal 213.

As described above, even if data having high redundancy such as an error correction code need not be added to image data during its transmission, the image data can be transmitted without its degradation.

In this embodiment, when an error occurs in the MAX value data $D_{max}$, the MIN value data $D_{min}$, and/or the division code $\Delta_{i,j}$ in the transmission data, the transmission data of an immediately preceding field period stored in the memories 207a, 207b, and 207c can be transmitted to the divided value inverting circuit 211 as interpolation data in place of the data having the error. However, the present invention is not limited to this scheme. For example, the transmission data of an immediately preceding field period, of transmission data which corresponds to an error, and transmission data corresponding to neighboring pixel blocks of a pixel block represented by the transmission data of the immediately preceding field period may be used to calculate interpolation data. With this arrangement, degradation of the image data can be minimized.

As described above, according to this embodiment, there is provided a method and system for efficiently transmitting high-quality image information.

The second embodiment of the present invention will be described below.

Figure 9A:
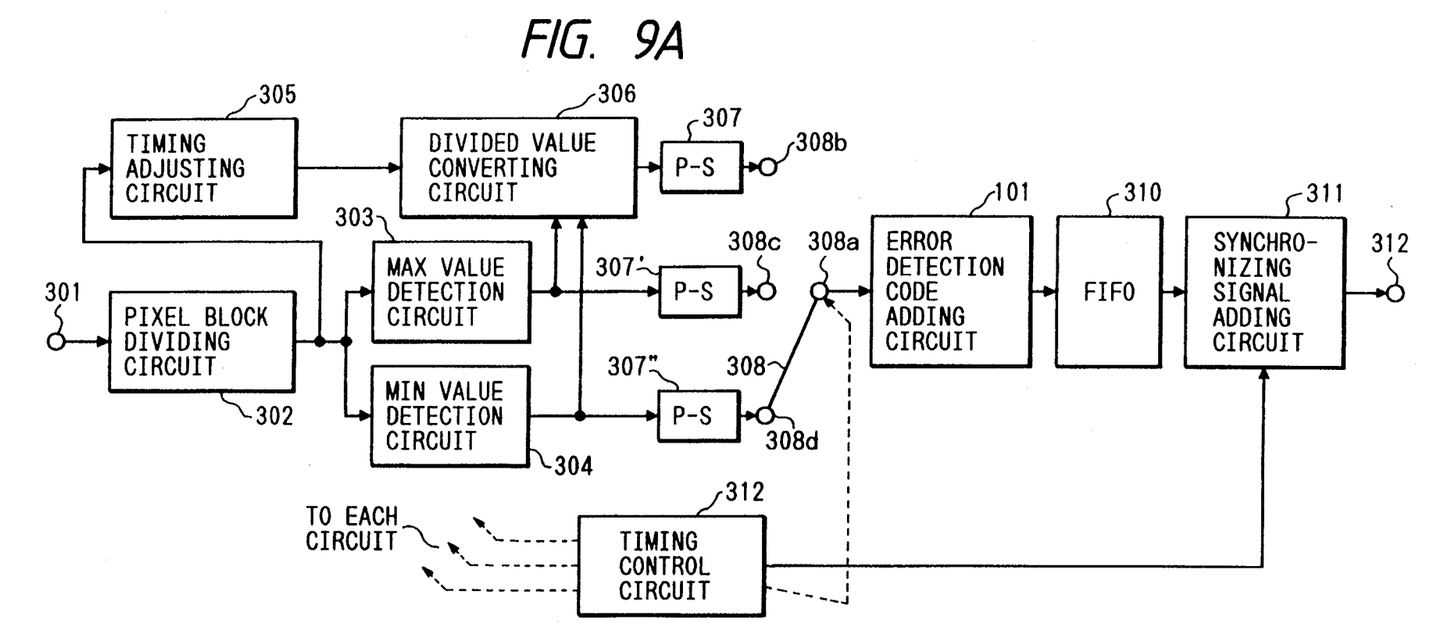
FIG. 9A is a schematic block diagram of a transmitting side of an image information transmitting system according to the second embodiment of the present invention.

FIG. 9A shows a schematic arrangement of a transmitting side of an image information transmitting system according to the second embodiment of the present invention. The same reference numerals as in FIG. 1 denote the same parts in FIG. 9A, and a detailed description thereof will be omitted.

Figure 9B:
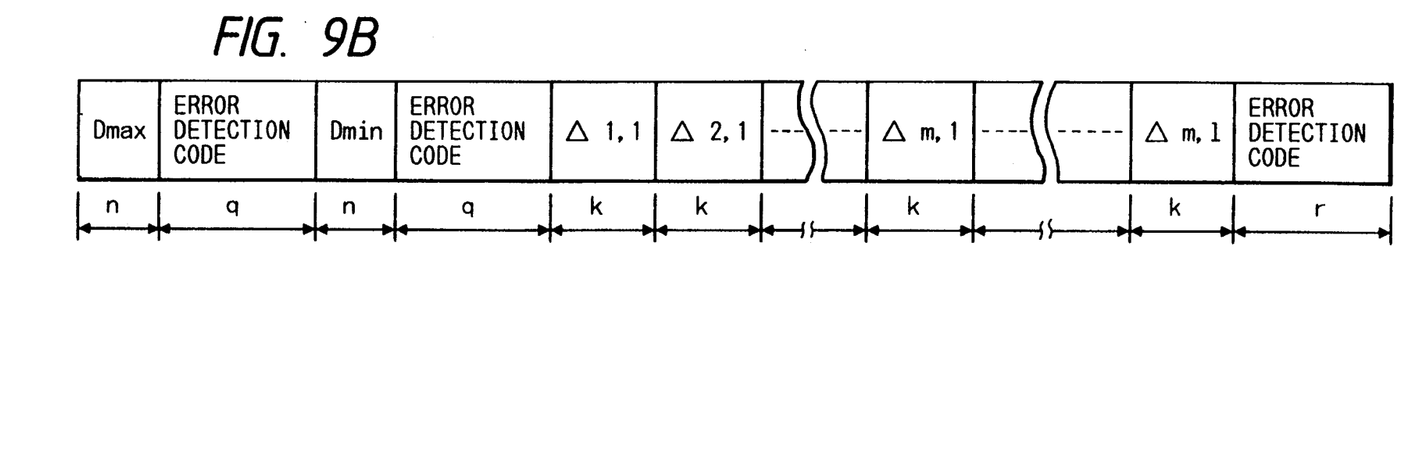
FIG. 9B is a view showing a transmission data string output from the transmitting side shown in FIG. 9A.

In this transmitting side shown in FIG. 9A, unlike the transmitting side shown in FIG. 1, an error detection code adding circuit 101 adds q- and r-bit error detection codes to serial data output from a data selector 308a, and the obtained data are supplied to a FIFO memory 310, as shown in FIG. 9B.

With the above arrangement, the error detection codes added by the error detection code adding circuit 101 are used to detect whether an error occurs in data. The number of bits of the error detection codes can be smaller than that of the error correction code, and redundancy of the transmission data can be reduced.

Figure 10:
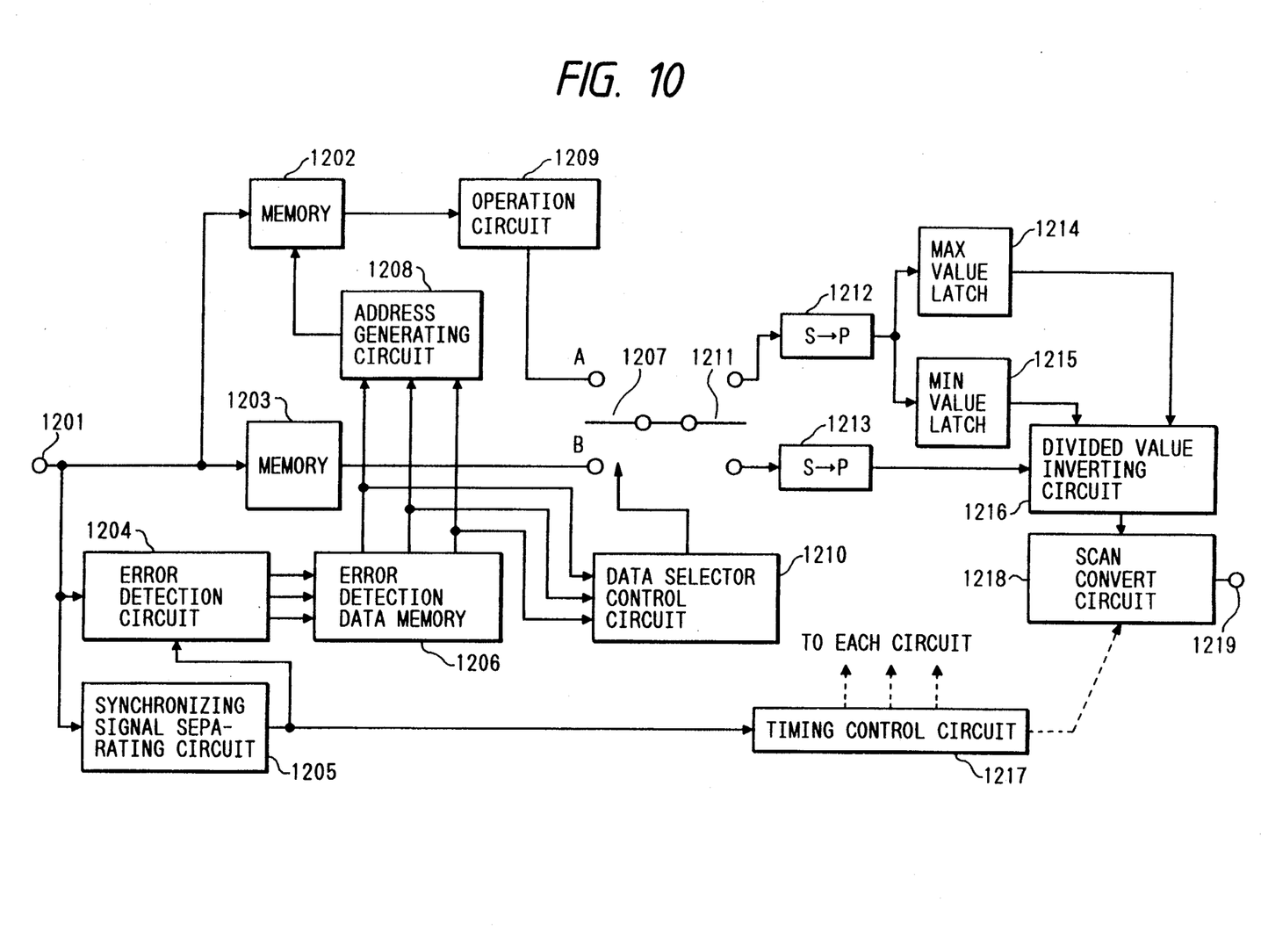
FIG. 10 is a schematic block diagram of a receiving side of the image information transmitting system according to the second embodiment of the present invention.

FIG. 10 shows a schematic arrangement of a receiving side of the image information transmitting system according to the second embodiment of the present invention.

Referring to FIG. 10, the receiving side includes an input terminal 1201 for receiving transmission data (FIG. 9B) coded with high efficiency by the transmitting side of FIG. 9A. The input transmission data is supplied to memories 1202 and 1203, an error detection circuit 1204, and a synchronizing signal separating circuit 1205.

The synchronizing signal separating circuit 1205 separates a synchronizing signal from the input transmission data and supplies the synchronizing signal to the error detection circuit 1204 and a timing control circuit 1217.

The timing control circuit 1217 controls operation timings of the respective circuits on the receiving side on the basis of the synchronizing signal supplied from the synchronizing signal separating circuit 1205.

The transmission data input from the input terminal 1201 are sequentially stored in the memories 1202 and 1203. The error detection circuit 1204 outputs error detection data representing that one of MAX value data $D_{max}$, MIN value data $D_{min}$, and a division code $\Delta_{i,j}$ in the transmission data input from the input terminal 1201 has an error. The error detection data output from the error detection circuit 1204 is stored in an error detection data memory 1206.

As described above, the transmission data corresponding to one-field image data is stored in the memories 1202 and 1203, and the error detection data corresponding to this transmission data is stored in the error detection data memory 1206. The data stored in the respective memories are then read out. During read access of each memory, new input transmission data and new error detection data are stored in the corresponding memory. Therefore, the memories store the new data in place of the readout data.

The transmission data stored in the memory 1203 is read out in a FIFO order and supplied to the B terminal of a data selector 1207.

When the MAX value data $D_{max}$ or the MIN value data $D_{min}$ has an error, an address generating circuit 1208 outputs to the memory 1202 an address for reading out the data $D_{max}$ or $D_{min}$ in the transmission data corresponding to the neighboring pixel blocks on the screen in response to the error detection data supplied from the error detection data memory 1206. When the division code $\Delta_{i,j}$ has an error, the address generating circuit 1208 outputs to the memory 1202 an address for reading out the codes $\Delta_{i,j}$ corresponding to the neighboring pixels in the pixel block. The stored data are read out from the memory 1202 in response to the read address output from the address generating circuit 1208. The readout data is supplied to an operation circuit 1209.

The operation circuit 1209 calculates interpolation MAX value data $D_{max}'$, interpolation MIN value data $D_{min}'$, and an interpolation division code $\Delta_{i,j}'$ by using the data supplied from the memory 1202. The calculated data are supplied to the A terminal of the data selector 1207.

The error detection data read out from the error detection data memory 1206 is also supplied to a data selector control circuit 1210. When a data error is represented by the input error detection data, the data selector control circuit 1210 connects the data selector 1207 to the A terminal. Otherwise, the data selector control circuit 1210 connects the data selector 1207 to the B terminal. When an error is present in the transmission data read out from the memory 1203, the data having an error is replaced with the corresponding interpolation data, and the interpolated data is output.

The transmission data output from the data selector 1207 is separated into n-bit data $D_{max}$ and $D_{min}$ and the division code $\Delta_{i,j}$ by a data selector 1211. These separated data are converted into parallel data by serial-to-parallel (S-P) converters 1212 and 1213.

The parallel MAX and MIN value data $D_{max}$ and $D_{min}$ from the S-P converter 1212 are latched by latches 1214 and 1215, respectively. The latched MAX and MIN value data $D_{max}$ and $D_{min}$ are supplied to a divided value inverting circuit 1216.

The division code $\Delta_{i,j}$ converted as parallel data by the S-P converter 1213 is also supplied to the divided value inverting circuit 1216.

The divided value inverting circuit 1216 decodes n-bit representation data $D_{i,j}'$ associated with the original pixel data on the basis of the division code $\Delta_{i,j}$ and the data $D_{max}$ and $D_{min}$ as in the receiving side shown in FIG. 6. The decoded value is supplied to a scan convert circuit 1218. The scan convert circuit 1218 converts the output data from the divided value inverting circuit 1216 in an order corresponding to raster scan. The converted data is output as decoded image data from an output terminal 1219.

As described above, without adding data having high redundancy such as an error correction code to image signal during its transmission, the image data can be corrected to an extent that image quality degradation occurring on the transmission line is negligible. Since extra data is not transmitted, transmission efficiency can be improved.

As described above, according to this embodiment, there is provided a method and system for efficiently transmitting high-quality image information.

The third embodiment of the present invention will be described below.

Figure 11A:
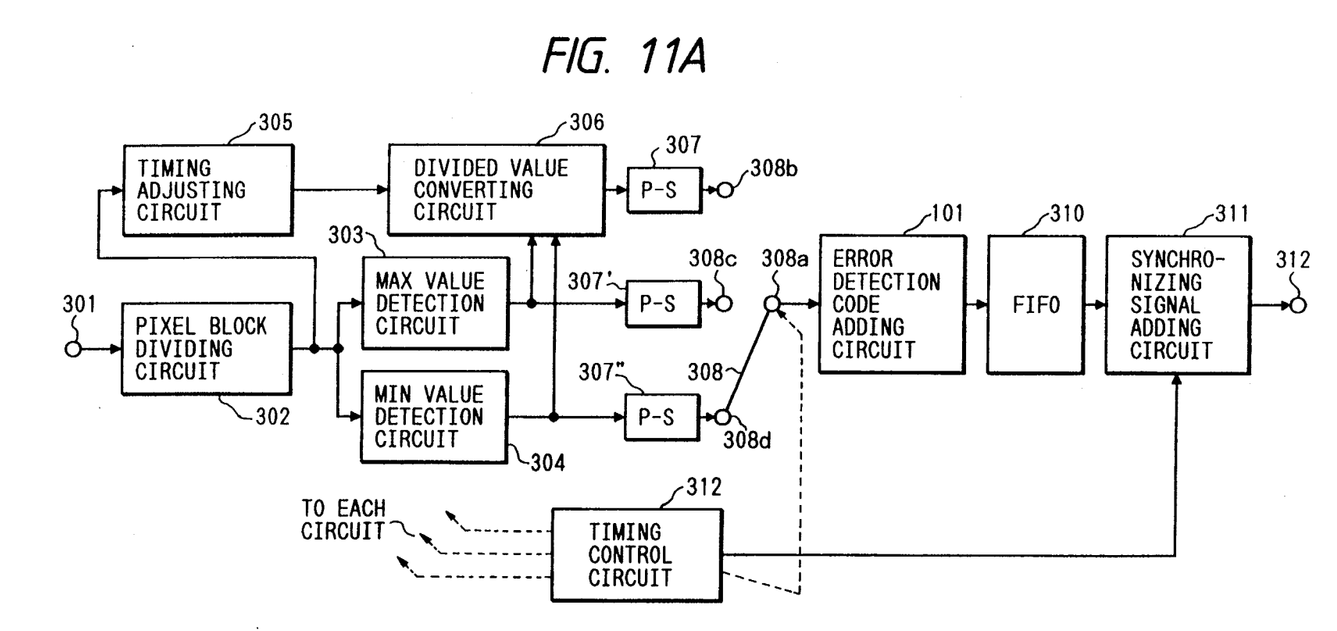
FIG. 11A is a schematic block diagram of a transmitting side of an image information transmitting system according to the third embodiment of the present invention.

FIG. 11A shows a schematic arrangement of a transmitting side of an image information transmitting system according to the third embodiment of the present invention. The same reference numerals as in FIG. 1 denote the same parts in FIG. 11A, and a detailed description thereof will be omitted.

Figure 11B:
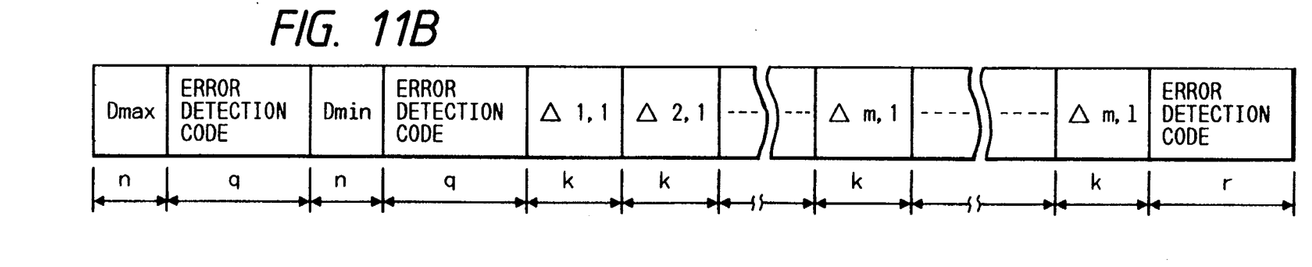
FIG. 11B is a view showing a transmission data string output from the transmitting side shown in FIG. 11A.

In this transmitting side shown in FIG. 11A, unlike the transmitting side shown in FIG. 1, an error detection code adding circuit 101 adds q- and r-bit error detection codes to serial data output from a data selector 308a, and the obtained data are supplied to a FIFO memory 310, as shown in FIG. 11B.

With the above arrangement, the error detection codes added by the error detection code adding circuit 101 are used to detect whether an error occurs in data. The number of bits of the error detection codes can be smaller than that of the error correction code, and redundancy of the transmission data can be reduced.

Figure 12:
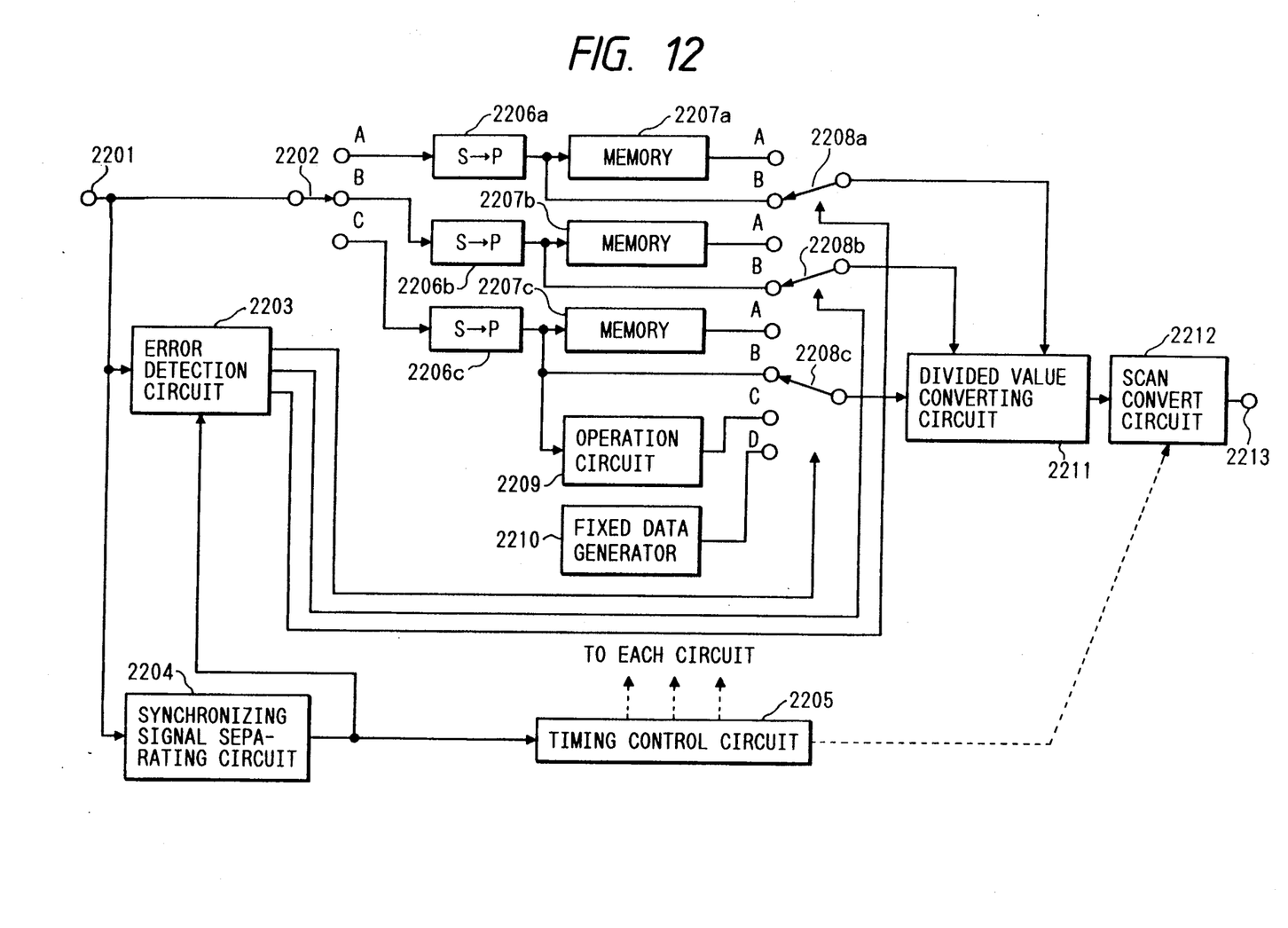
FIG. 12 is a schematic block diagram of a receiving side of the image information transmitting system according to the third embodiment of the present invention.

FIG. 12 shows a schematic arrangement of a receiving side of the image information transmitting system according to the third embodiment of the present invention.

Referring to FIG. 12, the receiving side includes an input terminal 2201 for receiving transmission data (FIG. 11B) coded with high efficiency by the transmitting side of FIG. 11A. The input transmission data is supplied to a data selector 2202, an error detection circuit 2203, and a synchronizing signal separating circuit 2204.

In the synchronizing signal separating circuit 2204, a synchronizing signal is separated from the input transmission data, and the separated synchronizing signal is supplied to the error detection circuit 2203 and a timing control circuit 2205.

The timing control circuit 2205 controls operation timings of the respective circuits in the receiving side on the basis of the synchronizing signal supplied from the synchronizing signal separating circuit 2204. The data selector 2202 supplies the n-bit data $D_{max}$ to the A side, the n-bit data $D_{min}$ to the B side, and the k-bit code $\Delta_{i,j}$ obtained by quantizing the data between the data $D_{max}$ and $D_{min}$ to the C side. These data are converted by serial-to-parallel (S-P) converters 2206a, 2206b, and 2206c into parallel data, respectively.

The MAX value data $D_{max}$ of each pixel block which is converted into the parallel data by the S-P converter 2206a is supplied to a memory 2207a and the B terminal of a data selector 2208a. The MIN value data $D_{min}$ of each pixel block which is converted into the parallel data by the S-P converter 2206b is supplied to a memory 2207b and the B terminal of a data selector 2208b. The division code $\Delta_{i,j}$ associated with each pixel data within each pixel block and converted into the parallel data by the S-P converter 2206c is supplied to a memory 2207c, the B terminal of a data selector 2208c, and an operation circuit 2209.

The memories 2207a, 2207b, and 2207c are used to delay the input data by a one-field period each. The A terminals of the data selectors 2208a, 2208b, and 2208c receive the MAX value data $D_{max}$, the MIN value data $D_{min}$, and the division code $\Delta_{i,j}$, respectively.

The operation circuit 2209 is a circuit for calculating an average value of the division codes $\Delta_{i,j}$ associated with the pixel data of the pixel blocks output from the S-P converter 2206c. The data calculated by the operation circuit 2209 is supplied to the C terminal of the data selector 2208c, and a fixed data generator 2210 generates data representing an intermediate value of the values represented by the division codes $\Delta_{i,j}$. The output from the fixed data generator 2210 is supplied to the D terminal of the data selector 2208c.

Note that switching of the data selectors 2208a, 2208b, and 2208c is controlled by an error detection result output from the error detection circuit 2203. More specifically, when the error detection circuit 2203 detects that no error occurs in the transmission data, the data selectors 2208a to 2208c are connected to the corresponding B terminals. When only the MAX value data $D_{max}$ has an error, the data selector 2208a is connected to the A terminal. When only the MIN value data $D_{min}$ has an error, the data selector 2208b is connected to the A terminal. When the MAX and MIN value data $D_{max}$ and $D_{min}$ and the division code $\Delta_{i,j}$ have errors, all the data selectors 2208a to 2208c are connected to the A side.

In this embodiment, when no error is present in the MAX data $D_{max}$ and the MIN value data $D_{min}$, and an error is present in the division code $\Delta_{i,j}$, the data selector 2208c is connected to the C or D terminal in accordance with an error rate. More specifically, when the error detection circuit 2203 detects that the number of errors in the division codes $\Delta_{i,j}$ exceeds a predetermined number, the average value of the division codes $\Delta_{i,j}$ cannot be calculated In this case, the data selector 2208c is connected to the D terminal, and data representing an intermediate value of the values of the division codes $\Delta_{i,j}$ is output from the data selector 2208c in place of the data representing the average value. However, when the error detection circuit 2203 detects that the detected number of errors in the division codes $\Delta_{i,j}$ is smaller than the predetermined number, the data selector 2208c is connected to the C terminal. Data representing the average value of the division codes $\Delta_{i,j}$ and calculated by the operation circuit 2209 is output from the data selector 2208c.

In the above operation, when an error occurs in the transmission data, the data selectors 2208a, 2208b, and 2208c output the corresponding interpolation data in place of the error data. The MAX value data $D_{max}$, the MIN value data $D_{min}$, and the division code $\Delta_{i,j}$ respectively output from the data selectors 2208a, 2208b, and 2208c are supplied to a divided value inverting circuit 2211. The divided value inverting circuit 2211 decodes n-bit representation value data $D_{i,j}$ associated from the original pixel data on the basis of the division code $\Delta_{i,j}$ and the data $D_{max}$ and $D_{min}$ as in the receiving side shown in FIG. 6. The decoded data is supplied to a scan convert circuit 2212.

The scan convert circuit 2211 converts the output data from the divided value inverting circuit 2211 in an order corresponding to raster scan. The converted data is output as decoded image data from an output terminal 2213.

As described above, even if data having high redundancy such as an error correction code is not added to image data during its transmission, various types of interpolation data can be formed in accordance with the error rate of the image data, and the data having an error is interpolated with the interpolation data. Therefore, the image data can be transmitted without being degraded.

As described above, according to this embodiment, there is provided a method and system for efficiently transmitting high-quality image information.

What is claimed is:

1. A method of transmitting image information, comprising:
   (A) a first step of dividing a plurality of pixel data comprising one frame into a plurality of pixel data blocks for every predetermined number of pixel data;
   (B) a second step of forming distribution information data representing a distribution of values of the pixel data comprising each pixel data block in units of the plurality of pixel data blocks divided by the first step and position information data representing a correspondence between the pixel data comprising the pixel data blocks and positions in the distribution information of the pixel data values represented by the distribution information data, and of transmitting the distribution information data and the position information data onto a transmission line; and
   (C) a third step of receiving the distribution information data and the position information data sent onto the transmission line in the second step, detecting whether an error occurs in the received distribution information data and position information data, and interpolating the detected erroneous data of the received distribution information data and position information data with other data in response to the detection of the occurrence of the error.

2. A method according to claim 1, wherein the third step includes the step of receiving the distribution information data and the position information data sent onto the transmission line in the second step, and detecting whether an error occurs in the received distribution information data and position information data, and interpolating the detected erroneous data with interpolation data formed by using data which has been already received in response to the detection of the occurrence of the error.

3. A method according to claim 1, wherein the third step includes the step of receiving the distribution information data and the position information data sent onto the transmission line in the second step, and detecting whether an error occurs in the received distribution information data and position information data, and interpolating the detected erroneous data with interpolation data formed by using data in which the error does not occur and which corresponds to a same frame as that of the detected erroneous data of the received distribution information data and position information data in response to the detection of the occurrence of the error.

4. A method according to claim 1, wherein the distribution information data are data representing maximum and minimum values of values of the pixel data constituting the pixel data block.

5. A method of transmitting image information, comprising:
   (A) a first step of dividing a plurality of pixel data comprising one frame into a plurality of pixel data blocks for every predetermined number of pixel data;
   (B) a second step of forming distribution information data representing a distribution of values of the pixel data comprising each pixel data block in units of the plurality of pixel data blocks divided by the first step and position information data representing a correspondence between the pixel data comprising the pixel data blocks and positions in the distribution information of pixel data values represented by the distribution information data, and of transmitting the distribution information data and the position information data onto a transmission line; and
   (C) a third step of receiving the distribution information data and the position information data sent onto the transmission line in the second step, and detecting whether an error occurs in said received distribution information data and position information data, and interpolating the detected erroneous data with interpolation data, representing a predetermined value in response to the detection of the occurrence of the error, when no error occurs in the received distribution information data and the error occurs more than a predetermined number of times in the position information data.

6. An apparatus for transmitting image information comprising:
   (A) pixel data block forming means for inputting an image information signal comprising a plurality of pixel data which forms one frame, and forming a plurality of pixel data blocks from the input image information signal, each of the plurality of pixel data blocks being formed by a predetermined number of pixel data;
   (B) transmitting means for forming dynamic range information data associated with a dynamic range of values of the pixel data comprising each pixel data block in units of the plurality of pixel data blocks formed by said pixel data block forming means, coding the pixel data comprising the pixel data blocks by using the dynamic range information data, forming a plurality of coded data in units of pixel data blocks, and transmitting the dynamic range information data and the coded data onto a transmission line; and
   (C) interpolating means for receiving the dynamic range information data and the coded data sent onto said transmission line by said transmitting means, and for detecting whether an error occurs in the received dynamic range information data and coded data, and for interpolating the detected erroneous data of the received dynamic range information data and coded data with other data in response to the detection of the occurrence of the error.

7. An apparatus according to claim 6, wherein said interpolating means is arranged to receive the dynamic range information data and the coded data sent onto the transmission line by said transmitting means, and detects whether the error occurs in the received dynamic range information data and coded data, and interpolates the detected erroneous data of the received dynamic range information data and coded data with interpolation data formed by using data in which the error does not occur and which corresponds to the same frame as that of the detected erroneous data of the received dynamic range information data and coded data in response to the detection of the occurrence of the error.

8. An apparatus for transmitting image information, comprising:
   (A) pixel data block forming means for inputting an image information signal comprising a plurality of pixel data which forms one frame, and forming a plurality of pixel data blocks from the input image information signal, each of the plurality of pixel data blocks being formed by a predetermined number of pixel data;
   (B) transmitting means for forming dynamic range information data associated with a dynamic range of values of the pixel data comprising each pixel data block in units of the plurality of pixel data blocks formed by said pixel data block forming means, coding the pixel data comprising the pixel data blocks by using the dynamic range information data, forming a plurality of coded data in units of pixel data blocks, and transmitting the dynamic range information data and the coded data onto a transmission line; and
   (C) interpolating means for receiving the dynamic range information data and the coded data sent onto said transmission line by said transmitting means, and for detecting whether an error occurs in said received dynamic range information data and coded data, and for interpolating the detected erroneous data of the received dynamic range information data and coded data with interpolation data representing a predetermined value, in response to the detection of the occurrence of the error, when no error occurs in the received dynamic range information data and the error occurs more than a predetermined number of times in the received coded data.

9. An apparatus according to claim 8, wherein the interpolation data is coded data corresponding to an intermediate value in the dynamic range represented by the dynamic range information data.

10. An apparatus according to claim 6, wherein the dynamic range information data are data representing maximum and minimum values of values of the pixel data constituting the pixel data block.

11. A method of transmitting image information, comprising:
   (A) a first step of dividing a plurality of pixel data comprising one frame into a plurality of pixel data blocks for every predetermined number of pixel data;
   (B) a second step of inputting, block by block, the plurality of pixel data blocks formed in the first step, of generating first information data representative of characteristics of the predetermined number of pixel data constituting the input pixel data block and second information data representative of characteristics of each pixel data by performing block coding of the predetermined number of pixel data, and of transmitting the first and second information data onto a transmission line; and
   (C) a third step of receiving the first information data and the second information data sent onto the transmission line in the second step, detecting whether an error occurs in the received first information data and second information data, and interpolating the detected erroneous data of the received first information data and second information data with other data in response to the detection of the occurrence of the error.

12. A method according to claim 11, wherein the third step includes a step of receiving the first information data and the second information data sent onto the transmission line in the second step, of detecting whether an error occurs in the received first information data and second information data, and of interpolating the detected erroneous data with interpolation data formed by using data which has been already received in response to the detection of the occurrence of the error.

13. A method according to claim 11, wherein the third step includes a step of receiving the first information data and the second information data sent onto the transmission line in the second step, of detecting whether an error occurs in the received first information data and second information data, and of interpolating the detected erroneous data with interpolation data formed by using data in which the error does not occur and which corresponds to a same frame as that of the detected erroneous data of the received first information data and second information data in response to the detection of the occurrence of the error.

14. A method according to claim 11, wherein in the block coding performed in the second step, the first information data which is not compressed is formed from the predetermined number of pixel data constituting the input pixel data block.

15. A method according to claim 11, wherein in the block coding performed in the second step, the second information data which is compressed is formed from the predetermined number of pixel data constituting the input pixel data block.

16. A method according to claim 11, wherein in the block coding performed in the second step, the first information data and the second information data whose information amount is less than that of the first information data are formed from the predetermined number of pixel data constituting the input pixel data block.

17. An apparatus for transmitting image information, comprising:
   (A) pixel digital block forming means for inputting an image information signal comprising a plurality of pixel data which forms one frame, and forming a plurality of pixel data blocks from the input image information signal, each of the plurality of pixel data blocks being formed by a predetermined number of pixel data;
   (B) transmitting means for inputting, block by block, the plurality of pixel data blocks formed by said pixel data block forming means, generating first information data representative of characteristics of the predetermined number of pixel data constituting the input pixel data block and second information data representative of characteristics of each pixel data by performing block coding of the predetermined number of pixel data, and transmitting the first and second information data onto a transmission line; and
   (C) interpolating means for receiving the first information data and the second information data sent onto the transmission line by said transmitting means, and for detecting whether an error occurs in the first information data and the second information data, and for interpolating the detected erroneous data of the first information data and the second information data with the other data in response to the detection of the occurrence of the error.

18. An apparatus according to claim 17, wherein said interpolating means is arranged to receive the first information data and the second information data sent onto the transmission line by said transmitting means, and detects whether the error occurs in the first information data and the second information data, and interpolates the detected erroneous data of the first information data and the second information data with interpolation data formed by using data in which the error does not occur and which corresponds to the same frame as that of the detected erroneous data of the first information data and the second information data in response to the detection of the occurrence of the error.

19. An apparatus according to claim 17, wherein in the block coding performed by said transmitting means, the first information data which is not compressed is formed from the predetermined number of pixel data constituting the input pixel data block.

20. An apparatus according to claim 17, wherein in the block coding performed by said transmitting means, the second information data which is compressed is formed from the predetermined number of pixel data constituting the input pixel data block.

21. An apparatus according to claim 17, wherein in the block coding performed by said transmitting means, the first information data and the second information data whose information amount is less than that of the first information data are formed from the predetermined number of pixel data constituting the input pixel data block.

* * * * *

UNITED STATES PATENT AND TRADEMARK OFFICE
CERTIFICATE OF CORRECTION

PATENT NO. : 5,448,298
DATED : September 5, 1995
INVENTOR(S) : AKIHIRO MIMOTO, et al.

It is certified that error appears in the above-indentified patent and that said Letters Patent is hereby corrected as shown below:

COLUMN 2

Line 2, "blocks" should read --blocks.--.

COLUMN 4

Line 53, "of to" should read --of--.

COLUMN 6

Line 41, "code $\leftarrow_{i,j}$" should read --code $\Delta_{i,j}$--.

COLUMN 9

Line 58, "selector 2208b" should read --selector 2208b.--.

UNITED STATES PATENT AND TRADEMARK OFFICE
CERTIFICATE OF CORRECTION

PATENT NO. : 5,448,298

DATED : September 5, 1995

INVENTOR(S) : AKIHIRO MIMOTO, et al.

It is certified that error appears in the above-indentified patent and that said Letters Patent is hereby corrected as shown below:

COLUMN 10

Line 33, "calculated" should read --calculated.--.

Signed and Sealed this

Twelfth Day of March, 1996

Attest:

BRUCE LEHMAN

Attesting Officer          Commissioner of Patents and Trademarks